United States Patent
Nie et al.

(10) Patent No.: US 11,166,215 B2
(45) Date of Patent: Nov. 2, 2021

(54) ELEVATOR SCENARIO DETECTION AND OPERATION FOR WIRELESS DEVICES

(71) Applicant: Apple Inc., Cupertino, CA (US)

(72) Inventors: Xiao Nie, Beijing (CN); Ruirui Zong, Palo Alto, CA (US); Yaoqi Yan, Beijing (CN); Tao Xie, Beijing (CN); Shangfeng Li, Beijing (CN); Yu Sun, Austin, TX (US); Ye Dai, Beijing (CN); Ying Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/882,085

(22) Filed: May 22, 2020

(65) Prior Publication Data

US 2020/0383024 A1 Dec. 3, 2020

(30) Foreign Application Priority Data

May 31, 2019 (CN) .......................... 201910470125.3

(51) Int. Cl.
*H04W 4/00* (2018.01)
*H04W 36/14* (2009.01)
(Continued)

(52) U.S. Cl.
CPC ........... *H04W 36/14* (2013.01); *H04W 36/30* (2013.01); *H04W 36/32* (2013.01); *H04W 88/10* (2013.01)

(58) Field of Classification Search
CPC ..... H04W 36/14; H04W 36/32; H04W 36/30; H04W 88/10; H04W 88/06; H04W 48/18;
(Continued)

(56) References Cited

U.S. PATENT DOCUMENTS 9,078,090 B1 * 7/2015 Shahmoon .............. G01S 19/47
9,081,079 B2 7/2015 Chao et al.
(Continued)

FOREIGN PATENT DOCUMENTS

CN 101656981 A 2/2010
CN 101827429 A 9/2010
(Continued)

OTHER PUBLICATIONS

First Office Action for Chinese Patent Application No. 201910470125. 3, dated Mar. 29, 2021, 19 pages.
(Continued)

*Primary Examiner* — Amancio Gonzalez
(74) *Attorney, Agent, or Firm* — Kowert, Hood, Munyon, Rankin & Goetzel, P.C.

(57) ABSTRACT

This disclosure relates to techniques for a wireless device to detect and operate in an elevator or elevator-like conditions. The wireless device may establish a cellular link with a cellular base station. One or more conditions associated with being in an elevator may be detected. The wireless device may determine to operate in an elevator mode based at least in part on detecting the one or more conditions associated with being in an elevator. The wireless device may operate in the elevator mode. One or more conditions associated with exiting an elevator may be detected. The wireless device may determine to operate in a normal mode based at least in part on detecting the one or more conditions associated with exiting an elevator. The wireless device may operate in the normal mode.

20 Claims, 16 Drawing Sheets

(51) Int. Cl.
*H04W 36/32* (2009.01)
*H04W 36/30* (2009.01)
*H04W 88/10* (2009.01)

(58) Field of Classification Search
CPC ..... H04W 48/20; H04W 24/08; H04W 24/02; H04W 36/0016; H04W 36/0088; H04W 48/16; H04B 17/318; H04B 17/382
USPC ......................................................... 370/332
See application file for complete search history.

(56) References Cited

U.S. PATENT DOCUMENTS

| | | | |
|---|---|---|---|
| 9,832,617 B1 * | 11/2017 | Mayor | .................. H04W 4/027 |
| 9,967,825 B2 * | 5/2018 | Hunt-Schroeder | .......................... H04W 52/0277 |
| 9,986,529 B2 * | 5/2018 | Palanki | .................. G01C 25/00 |
| 10,126,134 B2 | 11/2018 | Elhoushi et al. | |

| | | | |
|---|---|---|---|
| 2007/0041352 A1 | 2/2007 | Frankel et al. | |
| 2013/0344902 A1 | 12/2013 | Cili et al. | |
| 2015/0065143 A1 | 3/2015 | Hsu et al. | |
| 2018/0084487 A1 * | 3/2018 | Arumugam | ........... H04W 48/16 |
| 2019/0193986 A1 | 6/2019 | Studer et al. | |

FOREIGN PATENT DOCUMENTS

| | | |
|---|---|---|
| CN | 103906090 A | 7/2014 |
| CN | 105898836 A | 8/2016 |
| CN | 109041148 A | 12/2018 |
| CN | 109640388 A | 4/2019 |
| CN | 109743764 A | 5/2019 |

OTHER PUBLICATIONS

Leon Stenneth; "Detecting Human Activities Using Smartphones and Maps". Dissertation University of Illinois at Chicago, 2013. 207 Pages.

* cited by examiner

ELEVATOR SCENARIO DETECTION AND OPERATION FOR WIRELESS DEVICES

PRIORITY DATA

This application claims benefit of priority to Chinese Application No. 201910470125.3, titled "Elevator Scenario Detection and Operation for Wireless Devices", filed May 31, 2019, which is hereby incorporated by reference in its entirety as though fully and completely set forth herein.

FIELD

The present application relates to wireless communications, and more particularly to systems, apparatuses, and methods for a wireless device to detect and operate in an elevator or elevator-like conditions.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. Accordingly, improvements in the field are desired.

SUMMARY

Embodiments are presented herein of apparatuses, systems, and methods for a wireless device to detect and operate in an elevator or elevator-like conditions.

According to the techniques described herein, a wireless device may be configured to detect one or more conditions associated with entering and/or being inside of an elevator. The conditions may include any of various types and/or combinations of conditions, such as signal strength and/or service availability based conditions and motion detection based conditions.

Based at least in part on detecting conditions associated with entering and/or being inside of an elevator, the wireless device may determine to operate in an elevator mode, e.g., at least temporarily. While operating in the elevator mode, the wireless device may use a modified service search/scan pattern (e.g., if out-of-service), a modified approach to performing cell measurements, re-selection and/or cell searches for cells that operate according to a preferred radio access technology (e.g., if obtaining service from a cell that operates according to a non-preferred radio access technology), and/or otherwise modify its behavior, e.g., to more aggressively attempt to obtain service according to its preferred radio access technology. This may result in the wireless device more quickly obtaining service according to its preferred radio access technology, e.g., when such service becomes available after exiting the elevator, at least in some instances.

The wireless device may additionally be configured to detect one or more conditions associated with exiting and/or no longer being inside of elevator. The conditions may include any of various types and/or combinations of conditions, such as expiration of a timer associated with a typical duration spent within an elevator and/or one or more motion detection based conditions.

Based at least in part on detecting conditions associated with exiting and/or no longer being inside of an elevator, the wireless device may determine to operate in a normal mode. While operating in the normal mode, the wireless device may no longer use the modified behavior associated with the elevator mode, and may resume its normal approach to attempts to obtain service according to its preferred radio access technology. This may result in the wireless device operating in a more power efficient manner compared to the elevator mode, at least in some instances.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 17 illustrates aspects of an example cell search pattern that could be used in conjunction with an elevator mode of operation by a wireless device, according to some embodiments; and FIG. 18 illustrates aspects of an example additional cell search that could be used upon detection of exiting an elevator by a wireless device, according to some embodiments.

Figure 1:
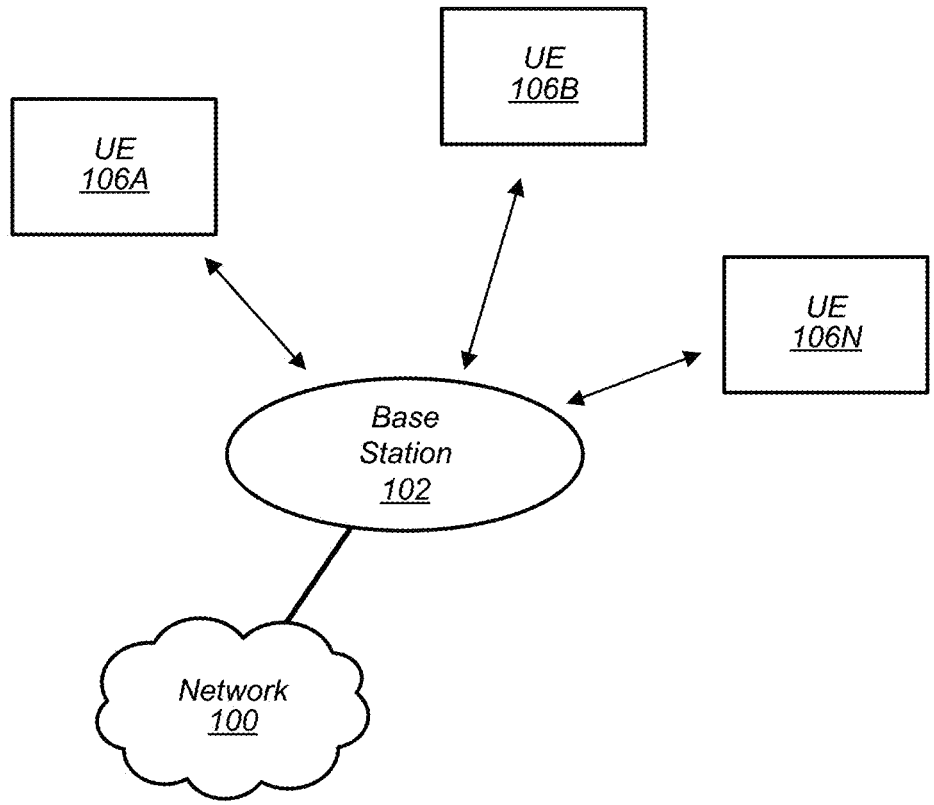
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DST, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
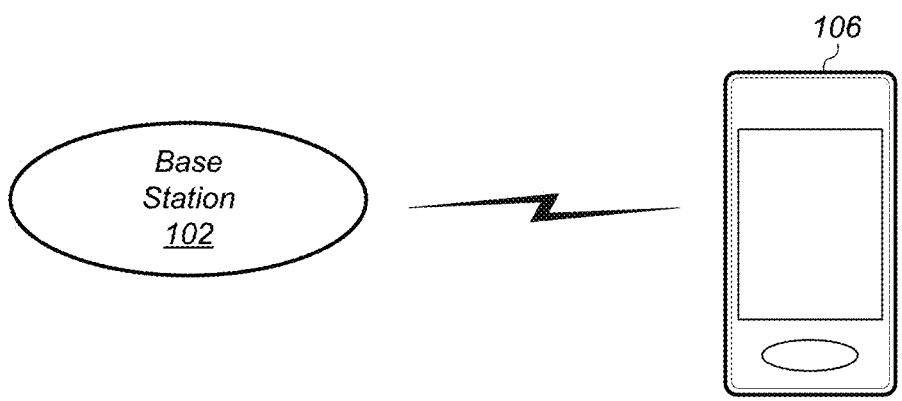
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to detect and operate in an elevator or elevator-like conditions such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
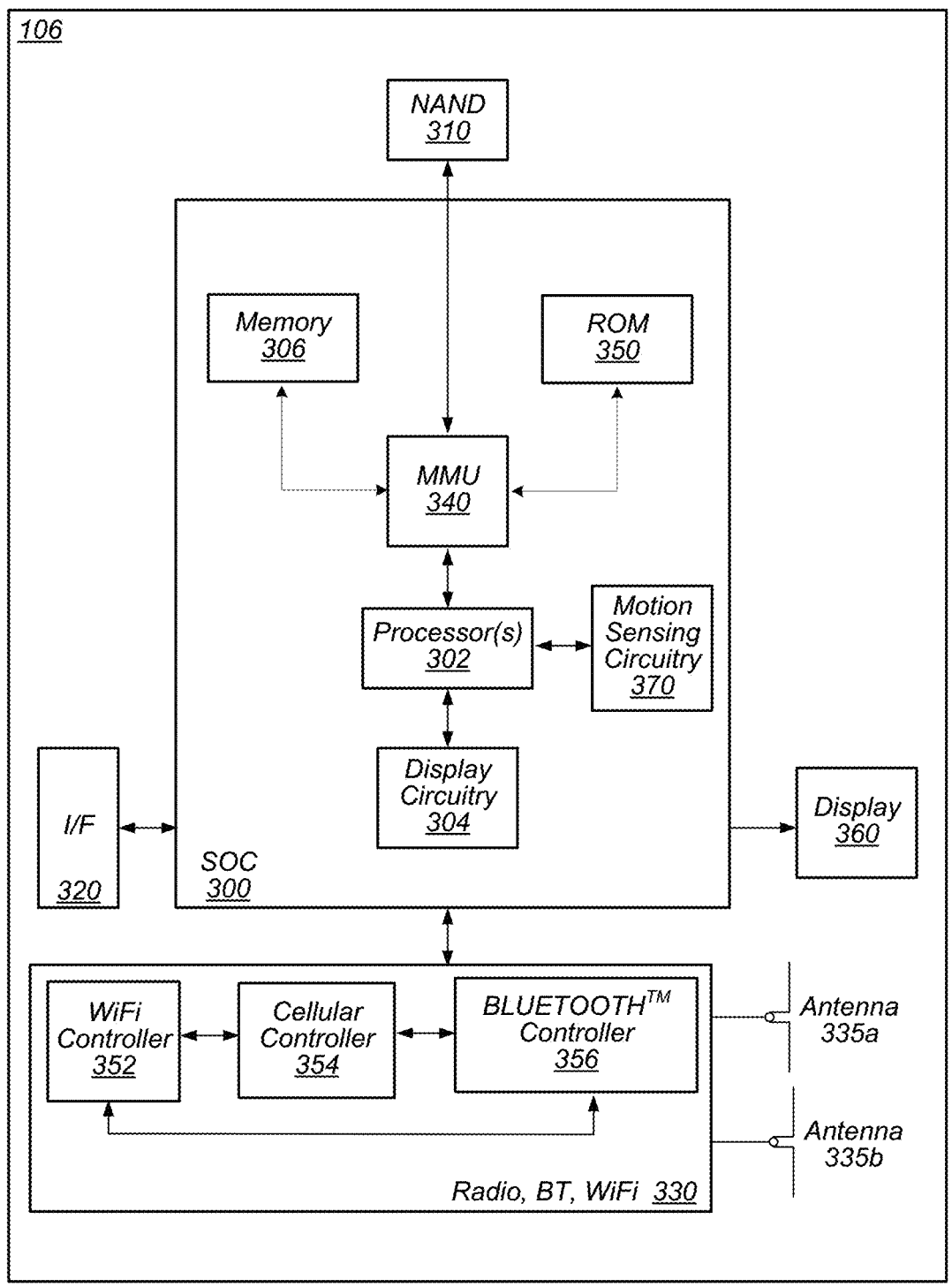
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to detect and operate in an elevator or elevator-like conditions such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to detect and operate in an elevator or elevator-like conditions according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
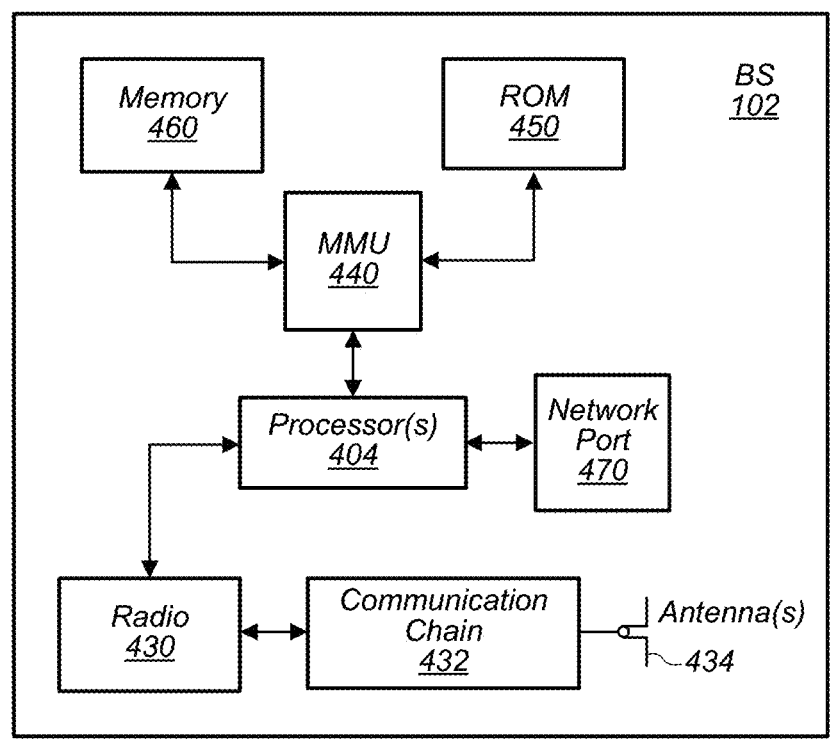
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard.

Figure 5:
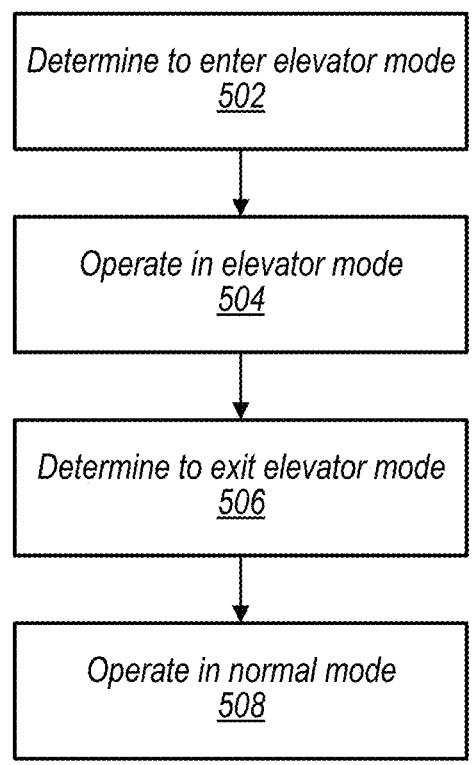
FIG. 5 is a flowchart diagram illustrating aspects of an exemplary possible method for a wireless device to determine when to operate in an elevator mode and when to stop operating in the elevator mode, according to some embodiments.

FIG. 5—Elevator Scenario Detection and Operation

Wireless devices are used in many scenarios, including in contexts in which cellular service may be readily available as well as in contexts in which cellular service may be limited or unavailable. As conditions change and wireless devices undergo mobility, transitions between such different contexts with different cellular service availability may occur. The manner in which a wireless device handles such transitions can have a substantial impact on user experience. For example, if a wireless device is relatively slow to obtain its preferred service when transitioning from an environment in which the preferred service becomes available after a period of unavailability, a user of the wireless device may be negatively impacted by such a slow recovery if the user attempts to use the wireless device during this time.

One example of such a transition scenario may include when a user enters and exits an elevator or another environment with elevator-like conditions. In many instances, such an environment may have a negative impact on service availability, e.g., at least for some radio access technologies, and may result in a wireless device performing cell re-selection (e.g., possibly to a different RAT with different propagation characteristics) or losing service altogether. While the duration in which a wireless device remains in such an environment may typically be relatively short, if the wireless device is not configured to detect entry to and/or exit from such an environment, and/or is not configured to adjust its operation to account for such transitions, it is possible that the wireless device could persist in an out-of-service condition or on a non-preferred RAT for a non-trivial amount of time even after service according to a preferred RAT is available. Accordingly, techniques for detecting when a wireless device may be in an elevator (or in elevator-like conditions) and for operating in an elevator mode may be beneficial, at least in some instances. FIG. 5 is a flowchart diagram illustrating such a method for a wireless device (e.g., a wireless user equipment (UE) device, as one possibility) to detect and operate in an elevator or elevator-like conditions, according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with LTE, LTE-A, NR, and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

A wireless device may establish a wireless link with a cellular base station. According to some embodiments, the wireless link may include a cellular link according to long term evolution (LTE). For example, the wireless device may establish a session with a mobility management entity of the cellular network by way of an eNB that provides radio access to the cellular network. As another possibility, the wireless link may include a cellular link according to 5G NR. For example, the wireless device may establish a session with an AMF entity of the cellular network by way of a gNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle mode) to a new serving cell, e.g., due to wireless device mobility, changing wireless medium conditions, and/or for any of various other possible reasons.

In 502, the wireless device may detect one or more conditions associated with being in an elevator and/or that are configured to trigger operation in an elevator mode, e.g., with respect to cellular communication, and may determine to enter an elevator mode. The condition(s) may include any of various conditions, including combinations of multiple conditions, which may be detected in any of various possible ways.

As one possible type of conditions, cellular signal related conditions may be used as an indicator of when the wireless device may be in an elevator. For example, elevator entry may be detected using certain patterns of serving cell signal strength changes that commonly occur when a wireless device enters an elevator, particularly in conjunction with certain RATs that may be more noticeably impacted by elevator conditions than other RATs, such as LTE. Thus, as one possibility, a certain decrease in LTE serving cell signal strength of at least a signal strength threshold over a specified time window could be used as one condition that could be associated with being in an elevator. In some instances, the serving cell signal strength could be averaged/filtered, and a sliding time window could be used to monitor whether the change in filtered signal strength of the serving cell over any given time window matches a configured signal strength decrease event profile. Note that multiple such signal strength decrease event profiles could be configured, for example to account for potentially different impacts on serving cell signal strength in different wireless medium conditions, for different elevator materials, different RATs, and/or for any of various other considerations. For example, different signal strength decrease event profiles may be configured such that a lower signal strength decrease threshold is required to trigger a signal strength decrease event if the average filtered signal strength of the serving cell over the time window is lower than if the average filtered signal strength of the serving cell over the time window is higher, since entering an elevator may cause a smaller signal strength decrease when starting from a relatively low serving cell signal strength than when starting from a relatively high serving cell signal strength.

At least in some instances, it may be the case that one or more other conditions in addition to detection of a serving cell signal strength decrease event may be required to trigger operation in an elevator mode. For example, as one possibility, the one or more conditions associated with being in an elevator may further include losing LTE service within a specified duration of detecting a serving cell signal strength decrease event. Use of such a combination of conditions may reduce the incidence of false positive detections of elevator entry, and/or may reduce the likelihood that the wireless device operates in the elevator mode when it may provide limited or no benefit, at least according to some embodiments.

As another possibility for detecting when the wireless device may be in an elevator, one or more motion detection based approaches may be used. For example, an accelerator component, a gyroscope component, and/or any of various other possible motion sensing components could be used to help detect a wireless device motion pattern that is considered characteristic of being in an elevator. As one such possibility, the wireless device could monitor acceleration data from an acceleration sensing component of the wireless device over a sliding time window. If the wireless device detects a match with a configured acceleration pattern of an elevator (e.g., amount, orientation, and/or duration of acceleration, etc.) in a given time window, this may be considered a condition associated with being in an elevator. Any number of other possible approaches to using motion sensing information to determine when the wireless device may be in an elevator are also possible. Note further that if desired, one or more other conditions may also or alternatively be required to trigger operation in an elevator mode, such as detection of limited or no walking-type motion, and/or any of various other such conditions. Still further, if desired, a combination of multiple types of approaches (e.g., cellular signal based, motion sensing based, etc.) to determining when a wireless device may be in an elevator may be used. For example, a wireless device may be configured to detect any of multiple such conditions associated with being in an elevator, and may determine to operate in an elevator mode based on detection of any of the configured sets of conditions configured to trigger such operation.

In 504, the wireless device may operate in an "elevator" mode, e.g., with respect to cellular communication, e.g., based at least in part on detecting the one or more conditions associated with being in an elevator. Operating in the elevator mode may include one or more differences relative to operating in a "normal" mode, for example including in the manner in which searching for service, neighbor cell measurements, and/or cell re-selection are performed. For example, while in elevator mode, the wireless device may be more aggressive in attempting to resume service using a preferred RAT, such as by searching for service according to the preferred RAT and/or attempting to re-select to a cell that operates according to the preferred RAT more quickly and/or more frequently than if the wireless device were operating in the normal mode.

For example, as one possibility, if the preferred RAT is LTE, and the wireless device is out of service, the wireless device may be configured to perform a scan for service using a different scanning pattern, which may include spending relatively more time searching for LTE cells, than when operating in the normal mode. After an initial cell selection scan including searching for cells in a stored list of cells according to LTE, UMTS, and GSM, followed by performing a band scan for cells according to LTE, UMTS, and GSM band databases, the elevator mode scan pattern could, for example, include skipping band searches for certain (e.g., non-LTE) RATs that would be performed when operating in the normal mode. This may reduce the amount of time to find an LTE cell when such a cell becomes available, thus potentially enabling a wireless device to more quickly obtain LTE service after an interruption caused by entering an elevator.

As another possibility, if the preferred RAT is LTE, and the wireless device is able to re-select to a GSM cell while in the elevator, the wireless device may alter its inter RAT (IRAT) neighbor cell measurement and re-selection operation in the elevator mode in comparison to the normal mode. For example, in the elevator mode, the wireless device may use a stored neighbor frequency list to perform LTE neighbor cell measurements, and to re-select to an LTE neighbor cell, potentially before receiving system information (e.g., in SI2quater instances) indicating LTE neighbor cell information from the GSM cell, where in the normal mode, the wireless device may perform LTE neighbor cell measurements, and potentially re-select to an LTE neighbor cell, based on the GSM cell system information, at least in some instances. This may reduce the amount of time to re-select from the GSM cell to an LTE cell when such a cell becomes available, thus potentially enabling a wireless device to more quickly obtain LTE service after an interruption caused by entering an elevator.

As still another possibility, if the preferred RAT is LTE, and the wireless device is able to re-select to a CDMA2000 (e.g., 1×) cell while in the elevator, the wireless device may alter its better service reselection (BSR)/dormancy timer to search for LTE in the elevator mode in comparison to the normal mode. For example, in the elevator mode, both in 1X idle mode and in 1×/hybrid traffic mode, LTE searches may be performed more frequently than in the normal mode. This may reduce the amount of time to re-select or handover to an LTE cell when such a cell becomes available, and thus, similar to the previously described possible operational modifications in elevator mode relative to normal mode, may potentially enable a wireless device to more quickly obtain LTE service after an interruption caused by entering an elevator.

Eventually, the wireless device may exit the elevator, at which point it may be beneficial (e.g., to reduce power consumption, to reduce service interruptions that could be caused by more aggressive scanning/searching for service according to a preferred RAT, and/or for any of various other reasons) to cease operating in the elevator mode and resume operating in the normal mode. The wireless device may accordingly be configured to detect certain conditions associated with exiting an elevator, and in 506, the wireless device may detect one or more such conditions and determine to exit the elevator mode.

Similar to the conditions associated with being in an elevator, any number and type of conditions may be configured to trigger ceasing operation in the elevator mode. As one such possibility, a timer may be used to determine when to stop operating in the elevator mode and begin operating in the normal mode. For example, the timer may be initiated when the wireless device begins operating in elevator mode (or at another time proximate to when the wireless device begins operating in elevator mode) and have a length that is selected based on an expected duration that a wireless device may typically spend in an elevator. In a scenario in which such a timer is used, expiration of the timer may be a condition associated with exiting an elevator and/or for triggering ceasing operation in the elevator mode.

Note that in some instances (e.g., if a sequence of conditions are required to determine that the wireless device is in an elevator) the timer length may be determined as a specified length (e.g., the length selected based on an expected elevator ride duration) minus a time difference between an initial condition used to determine that the wireless device is in an elevator and initiating operation in the elevator mode. For example, if the conditions to trigger operation in elevator mode include a loss of service according to a preferred RAT occurring within a specified duration after a serving cell signal strength decrease event, the time difference between the loss of service and the serving cell signal strength decrease event may be subtracted from the base timer length.

As another possibility, a motion sensing based approach may be used to detect conditions associated with exiting an elevator. For example, similar to the approach previously described herein for using motion sensing information to determine when a wireless device has entered an elevator, the wireless device could monitor acceleration data from an acceleration sensing component of the wireless device over a sliding time window. If the wireless device detects a match with a configured acceleration pattern of an elevator (e.g., amount, orientation, and/or duration of acceleration, etc.) in a given time window, this may be considered a condition associated with an elevator coming to a stop. In addition (or alternatively), if the wireless device detects a movement and/or acceleration pattern associated with walking in a given time window (e.g., that is sufficiently long to exclude most instances of walking within an elevator) after detecting a condition associated with an elevator coming to a stop and/or after detecting a condition associated with elevator movement, this may be considered a condition associated with exiting an elevator. Any number of other possible approaches to using motion sensing information to determine when the wireless device may have exited an elevator are also possible, and if desired, one or more other conditions may also or alternatively be required to trigger a transition from operation in the elevator mode to operation in a normal mode. Note further that, if desired, a combination of multiple (e.g., signal strength, timer, and/or motion sensing based) approaches to determining when to cease operating in the elevator mode may be used. For example, a wireless device may initiate a timer such as described herein when beginning operating in the elevator mode, and may trigger a transition from the elevator mode to the normal mode at whichever is earlier among expiration of the timer, detection of one or more motion sensing information based conditions associated with exiting an elevator, and/or any other configured conditions associated with exiting an elevator.

Note that in some instances, in addition or as an alternative to other modifications to wireless device behavior based on detection of conditions associated with entering and/or exiting an elevator, the wireless device may perform a cell search specifically triggered by detection of one or more conditions associated with exiting an elevator. As one such possibility, if the wireless device does not have service according to a preferred RAT when the condition(s) associated with exiting an elevator are detected, a search for cells that operate according to the preferred RAT may be performed by the wireless device based at least in part on detection of one or more conditions associated with exiting an elevator and/or not having service according to the preferred RAT. For example, if the preferred RAT is LTE, the wireless device may perform a search for LTE cells in a stored carrier frequency list, and/or a band search of one or more LTE bands, based on detection of an "exiting elevator" event. Such a search may interrupt an ongoing search for cells according to another RAT, if desired, e.g., to prioritize the preferred RAT in view of the increased likelihood of availability of a cell that operates according to the preferred RAT upon exiting the elevator.

In 508, the wireless device may operate in a normal mode, e.g., with respect to cellular communication, e.g., based at least in part on detecting the one or more conditions associated with exiting an elevator. As previously noted, operating in the normal mode may include one or more differences relative to operating in the elevator mode. Such differences may include less aggressively attempting to resume service using a preferred RAT if not already obtaining service via the preferred RAT than while operating in the elevator mode. At least in some instances, the search/scan pattern(s) used while in the normal mode may have reduced power consumption and/or less impact on user experience when in most circumstances other than while in an elevator and for a limited duration after exiting an elevator, such that the wireless device may benefit from resuming the normal mode of operation once the wireless device has exited the elevator.

FIGS. 6-18—Additional Information

FIGS. 6-18 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

At least in some instances, cellular signal strength may decrease substantially when a wireless device enters an elevator (or more generally a location enclosed by materials that may negatively impact wireless signal propagation in a manner similar to an elevator), at least for some RATs, such as LTE. In such scenarios, a wireless device that was obtaining cellular service via an impacted RAT may go out-of-service or fall back to a different RAT that is less impacted by the propagation characteristics of the elevator, such as GSM, 1×, or WCDMA. If a typical cell search pattern is used in such a scenario, it is possible that there could be a substantial delay to regain service via the original (or otherwise preferred) RAT after exiting the elevator.

Accordingly, it may be the case that techniques for detecting when a wireless device may be entering and exiting an elevator, and operational modifications during such times, may have a beneficial impact on cellular service availability and potentially user experience at the wireless device.

Figure 6:
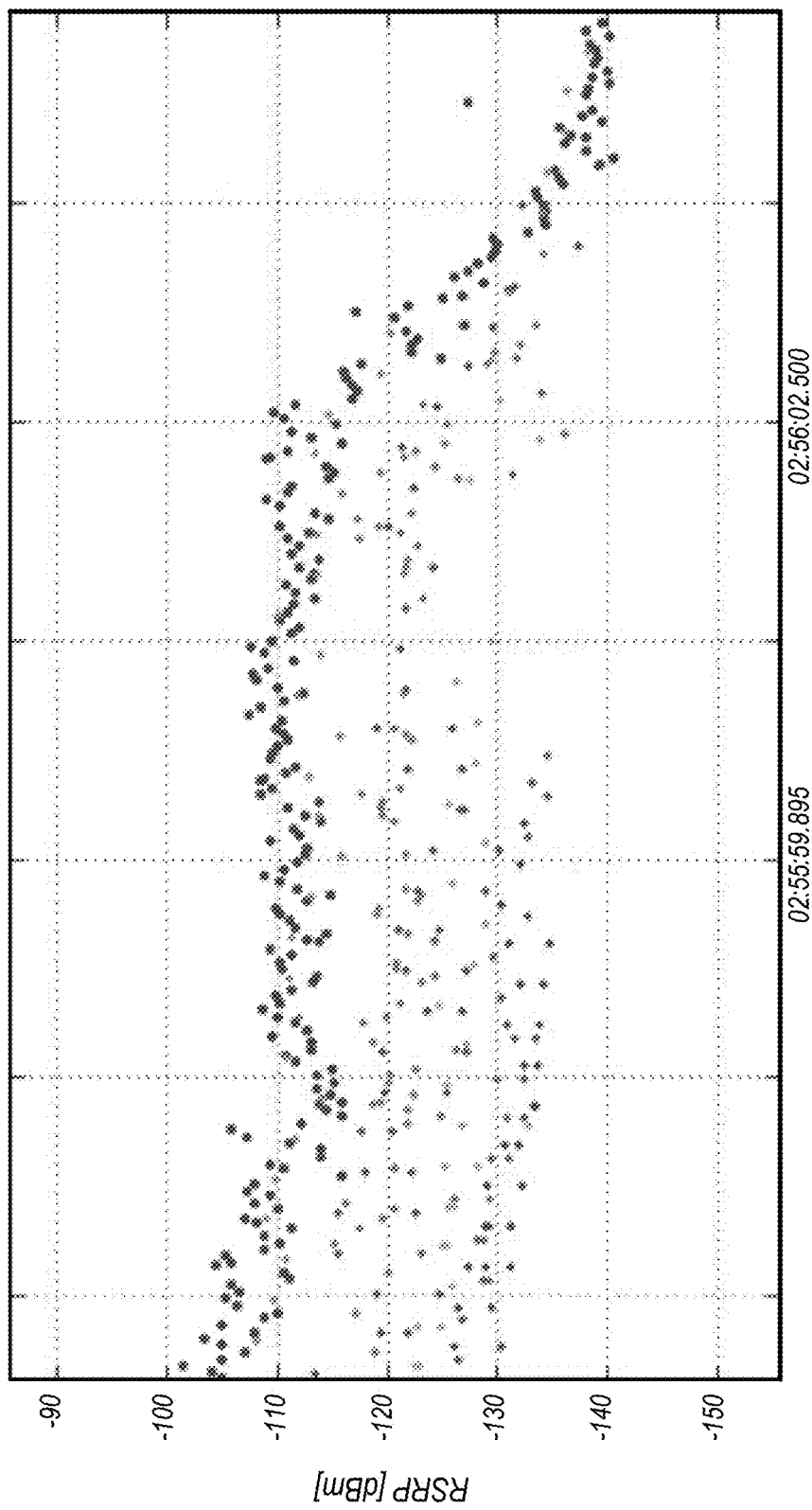
FIGS. 6-7 illustrate signal strength loss patterns, while in LTE connected mode and in LTE idle mode respectively, in an example test scenario associated with entering an elevator, according to some embodiments.
Figure 7:
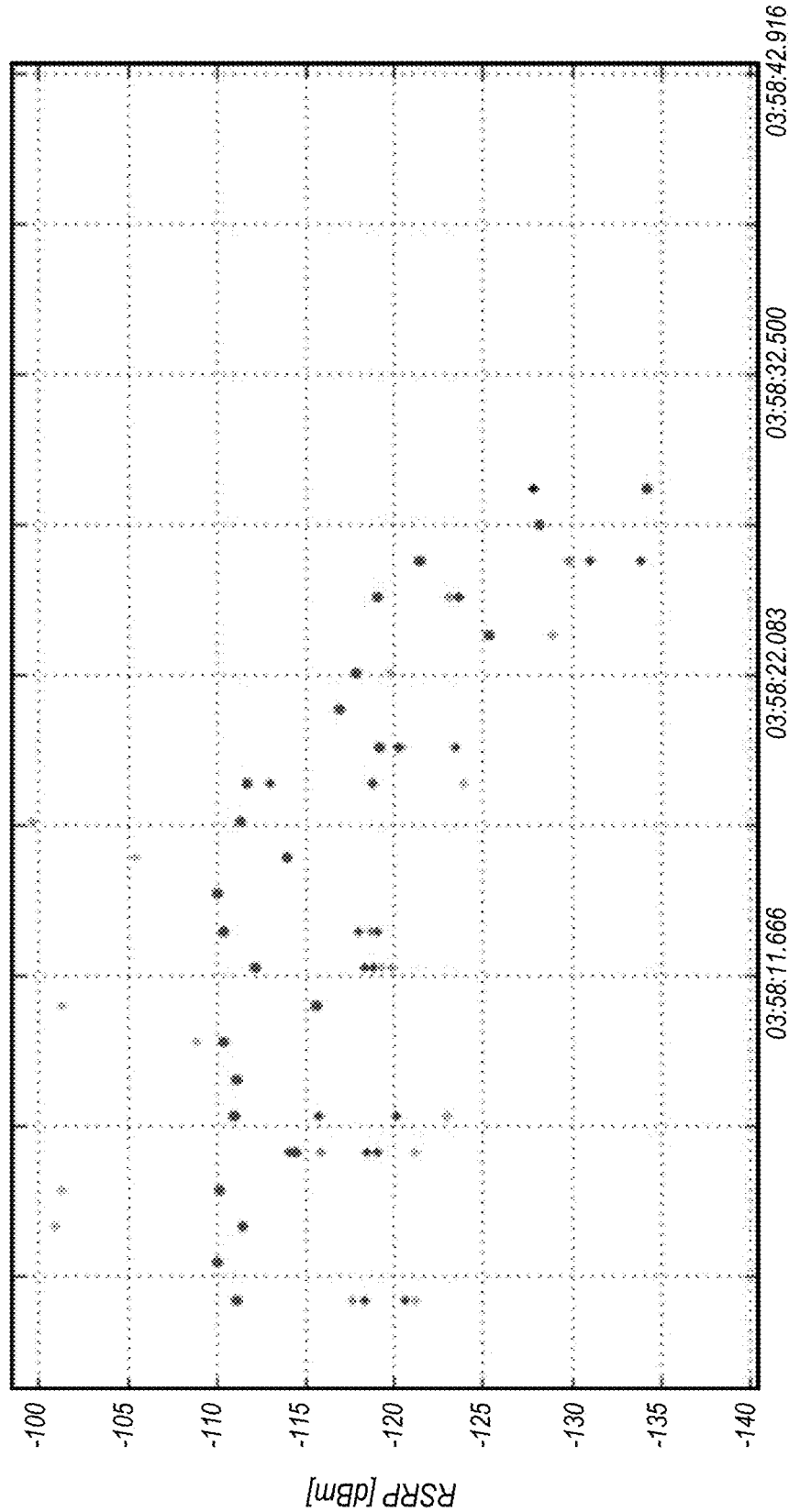

Multiple approaches to determining when to operate in an elevator mode are possible. As one possible approach, a signal strength/service availability approach may be used. For example, in LTE, the reference signal received power (RSRP) may change (e.g., decrease) when entering an elevator in a manner that can be detected as a "RSRP drop event". FIGS. 6-7 illustrate RSRP measurements that could be taken over a period of time in which a wireless device is entering an elevator, while in connected mode and idle mode respectively. As shown, in each scenario a characteristic drop in RSRP over a certain time window can be seen. Accordingly, it may be possible to monitor filtered RSRP measurements of the wireless device over a sliding time window (which may have a different length and/or include a different number of measurements depending on whether the wireless device is in connected mode or idle mode), and to determine whether the delta of the filtered RSRP is greater than a defined threshold in any given time window of the sliding time window. As one possibility, the sliding time window may include 60 RSRP reports (e.g., a 40 ms interval) in connected mode, or 10 RSRP reports (e.g., a variable interval depending on a configured discontinuous reception interval) in idle mode. It should be noted that these examples are not intended to be limiting to the disclosure as a whole, and that any of various other sliding time windows are also possible.

Figure 8:
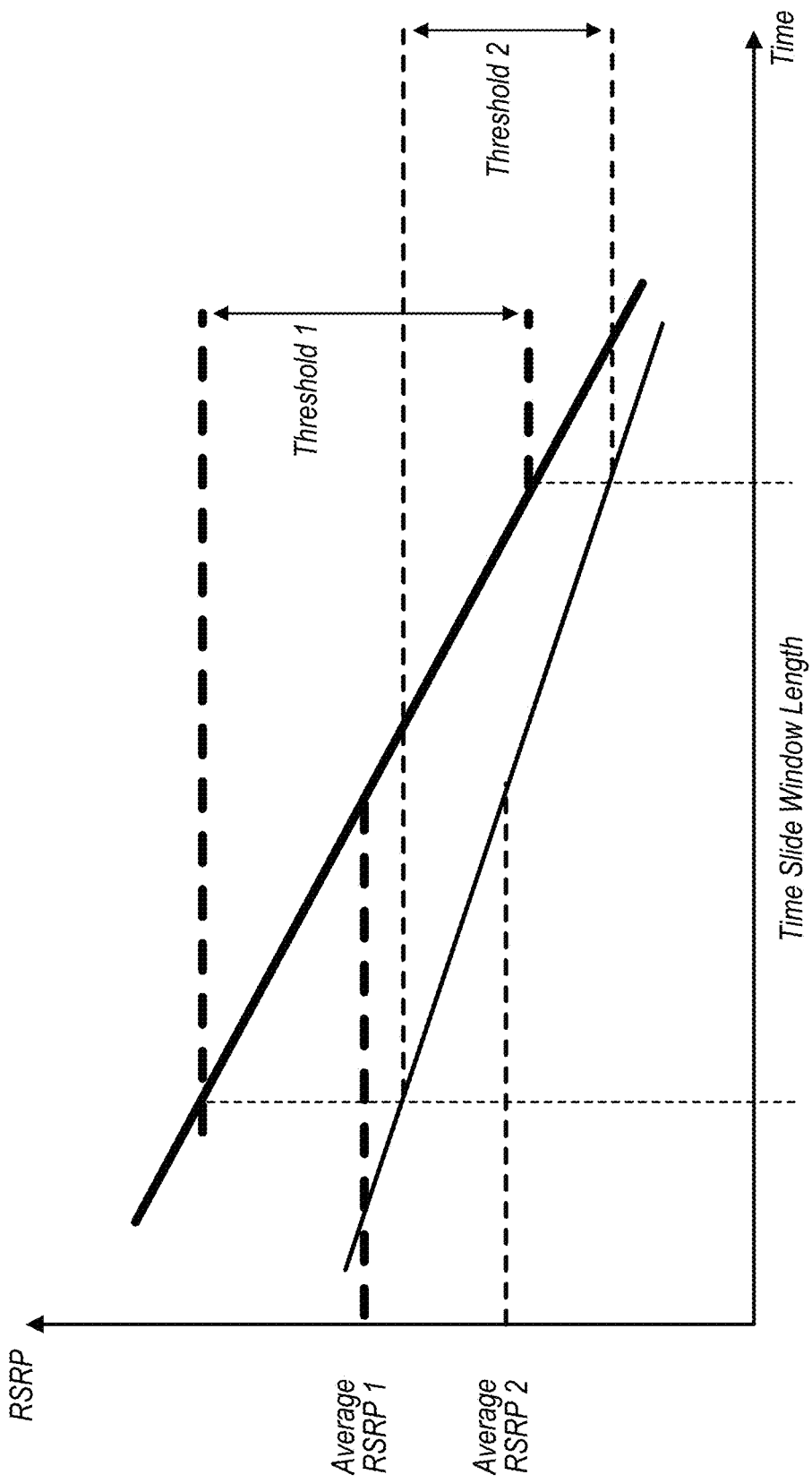
FIG. 8 illustrates exemplary possible signal strength decrease thresholds that could be associated with different average signal strengths for use in determining when to operate a wireless device in an elevator mode, according to some embodiments.

Note additionally that multiple thresholds to trigger RSRP drop events may be defined, e.g., to capture the possibility of different radio conditions experiencing different degrees of RSRP decreases upon entering an elevator. For example, a defined threshold may include a total RSRP delta to trigger a RSRP event combined with an average (e.g., over the applicable time window) or instantaneous (e.g., at the beginning of the applicable time window) RSRP at which the total RSRP delta is applicable. FIG. 8 is a graph illustrating how multiple such thresholds could be defined. As shown, for a higher average RSRP (average RSRP 1) over a time window, a larger threshold (threshold 1) may be used, while for a lower average RSRP (average RSRP 2) over the time window, a smaller threshold (threshold 2) may be used.

In addition to a RSRP drop event, it may be the case that another event is used to trigger elevator mode operation. In particular, an LTE inactive event, in which the wireless device leaves the LTE RAT (e.g., the wireless device goes out of service in LTE, is redirected from LTE to another RAT, or re-selects to another RAT from LTE), may be used in conjunction with a RSRP drop event to trigger elevator mode operation. For example, an evaluation period for potentially correlating a LTE inactive event with a RSRP drop event may be used after a RSRP drop event is detected. If a LTE inactive event is detected within the correlation period, elevator mode operation may be triggered. If no LTE inactive event is detected within the correlation period, the RSRP drop event alone may not be considered sufficient to trigger elevator mode operation.

Figure 9:
FIGS. 9-10 area histogram and cumulative distribution function illustrating example test results associated with duration spent in an elevator, according to some embodiments.

FIG. 9 illustrates a possible timeline showing how such a correlation between a RSRP drop event and a LTE inactive event could be used to trigger elevator mode operation, according to some embodiments. As shown, an initial RSRP drop event N may occur, followed by another RSRP drop event N+1, while the wireless device operates in normal mode. An evaluation timer ("T_evaluation") may run from the most recent RSRP drop event N+1, and a LTE inactive event may occur prior to expiration of the evaluation timer. Since the LTE inactive event occurred within the specified correlation range of the most recent RSRP drop event, elevator mode operation may be triggered.

In some instances, a timer may also be used to determine how long to operate in elevator mode. As one possibility, the length of such a timer may have a length calculated as a base timer length ("T_elevator_duration") minus a time delta between the LTE inactive event and the most recent RSRP drop event prior to the LTE inactive event. In other words, the wireless device may transition back to normal mode operation at the base timer length after the RSRP drop event used when determining to operate in elevator mode. Note that it may be the case that any LTE inactive events and/or RSRP drop events that occur while in elevator mode may be ignored (e.g., at least for the purpose of determining whether to operate in elevator mode, at least in some instances).

Figure 10:
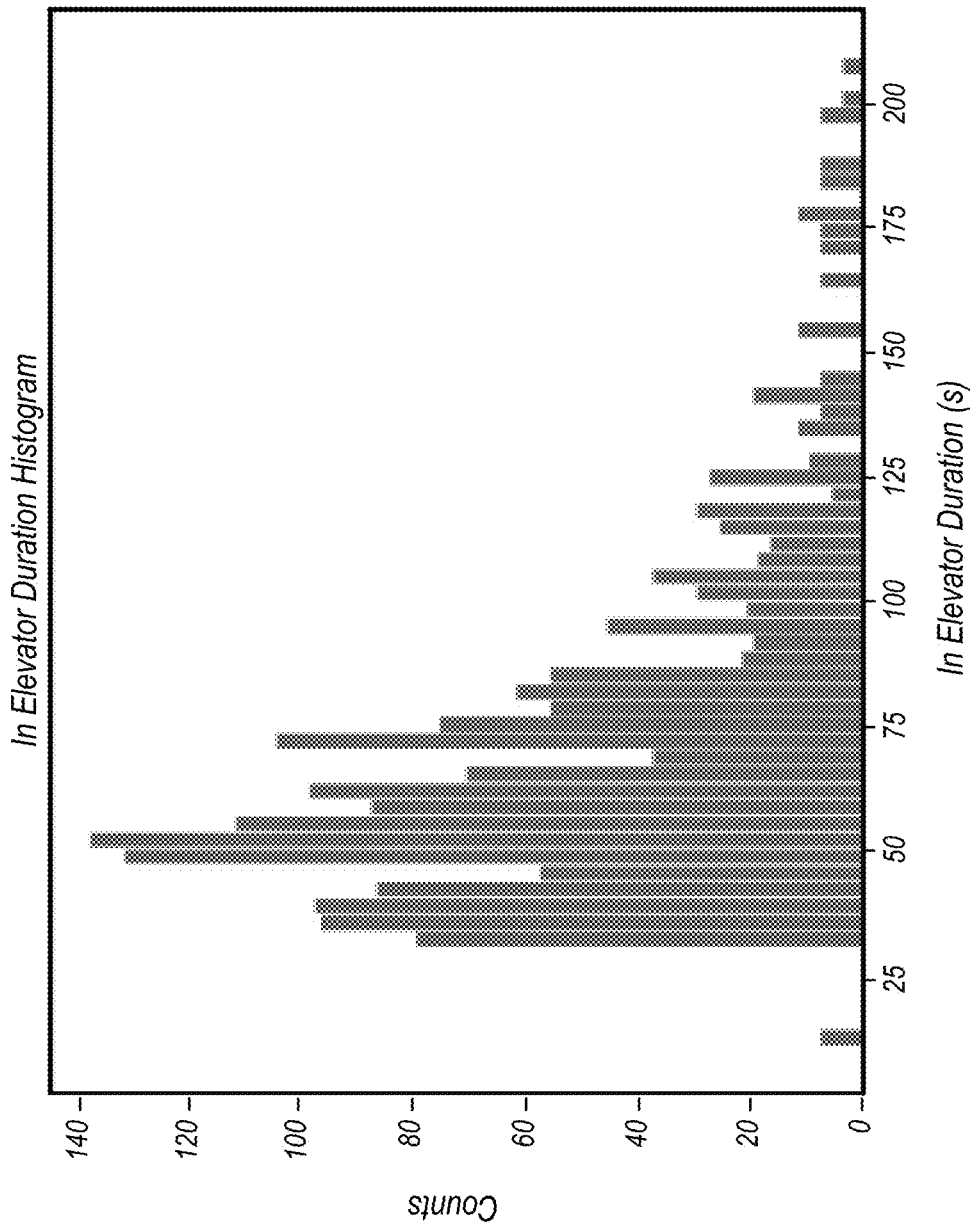
Figure 11:
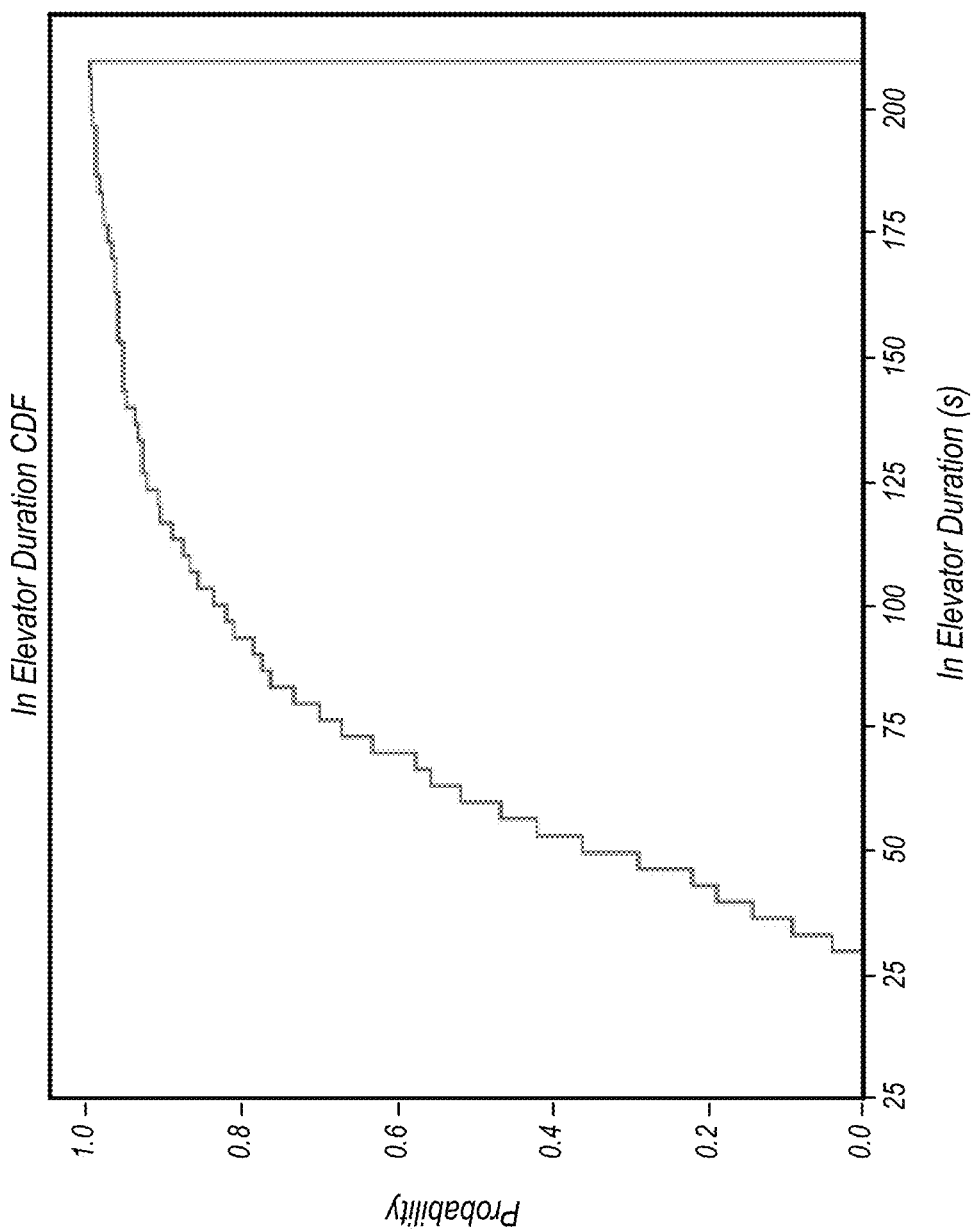
FIGS. 11-12 are a histogram and cumulative distribution function illustrating example test results associated with a correlation duration between a signal strength drop event and a LTE inactivation event when entering an elevator, according to some embodiments.

Any of a variety of possible lengths may be used as the base timer length T_elevator_duration. As one possibility, a value may be selected that is expected to be greater than the duration spent in an elevator for a specified percentage of instances. FIGS. 10-11 are a histogram and cumulative distribution function illustrating example test results associated with duration spent in an elevator, e.g., that could be used to help select such a value, according to some embodiments. Using the illustrated test results, for example, a value of 120 s could be selected to cover approximately 90% of instances. Alternatively, a longer value could be selected to cover a higher percentage of instances, or a shorter value could be selected to cover a lower percentage of instances, as desired. Note further that the illustrated test results are provided by way of example only, and that other elevator duration test results could be obtained in other test scenarios, which could in turn result in a different value being selected as being expected to cover a desired percentage of instances.

Figure 12:
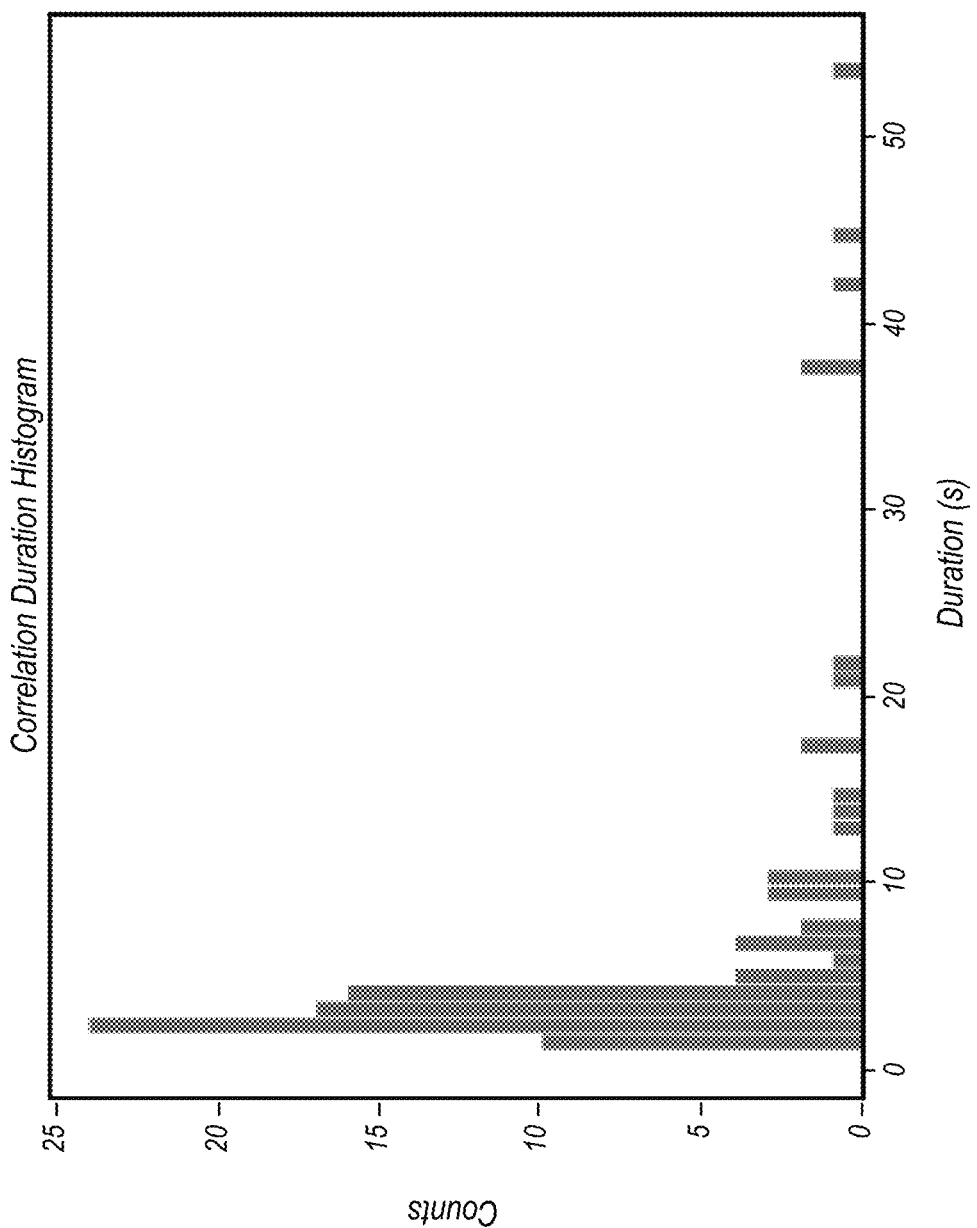
Figure 13:
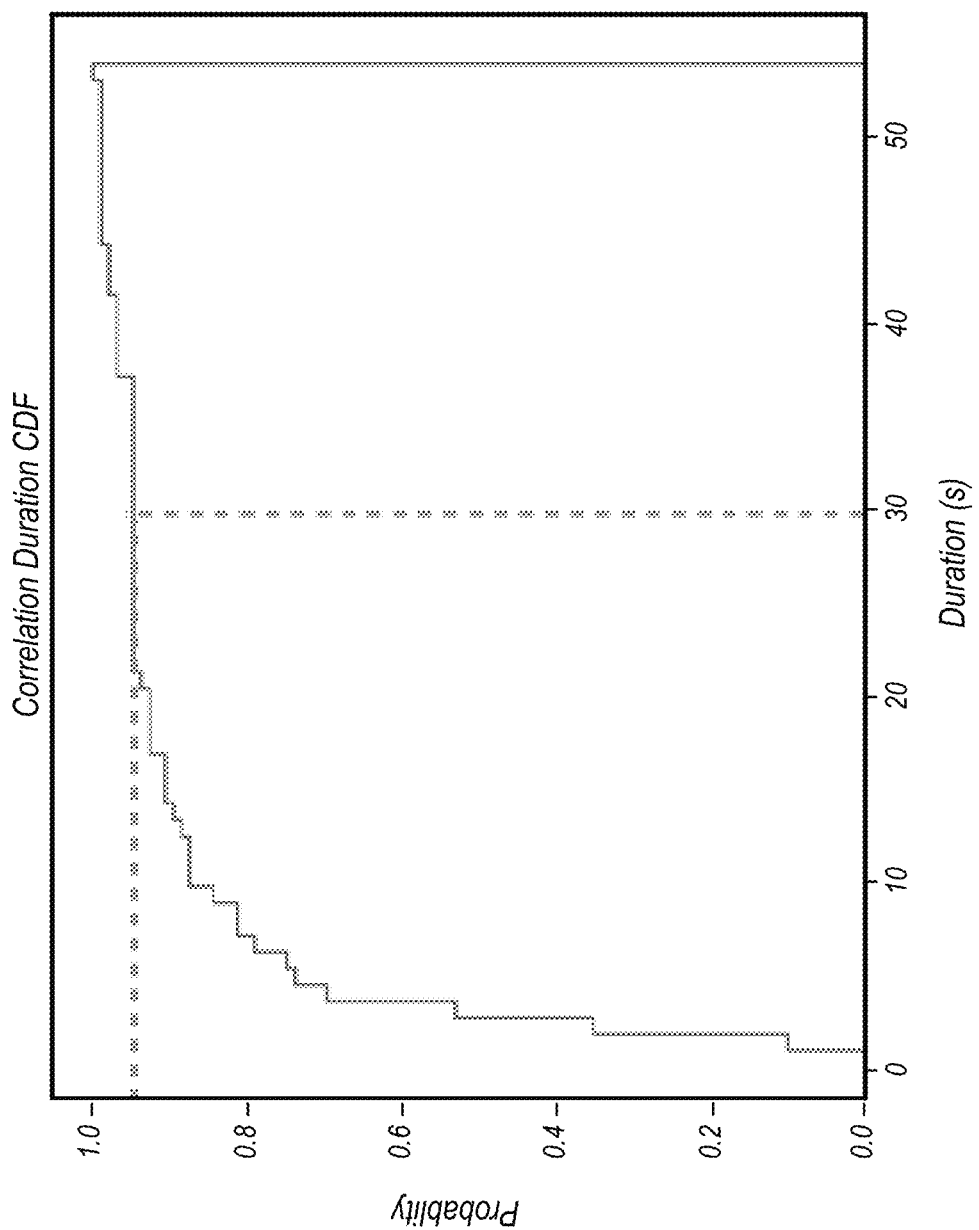
FIG. 13 illustrates aspects of an example approach for a wireless device to determine when to operate in an elevator mode, according to some embodiments.

Similarly, any of a variety of possible lengths may be used as the correlation length T_evaluation. As one possibility, a value may be selected that is expected to be greater than the temporal difference between a RSRP drop event and an LTE inactive event when entering an elevator for a specified percentage of instances. FIGS. 12-13 are a histogram and cumulative distribution function illustrating example test results associated with the temporal difference between a RSRP drop event and an LTE inactive event when entering an elevator, e.g., that could be used to help select such a value, according to some embodiments. Using the illustrated test results, for example, a value of 30 s could be selected to cover approximately 90% of instances. Alternatively, a longer value could be selected to cover a higher percentage of instances, or a shorter value could be selected to cover a lower percentage of instances, as desired. Note further that the illustrated test results are provided by way of example only, and that other event correlation test results could be obtained in other test scenarios, which could in turn result in a different value being selected as being expected to cover a desired percentage of instances.

Figure 14:
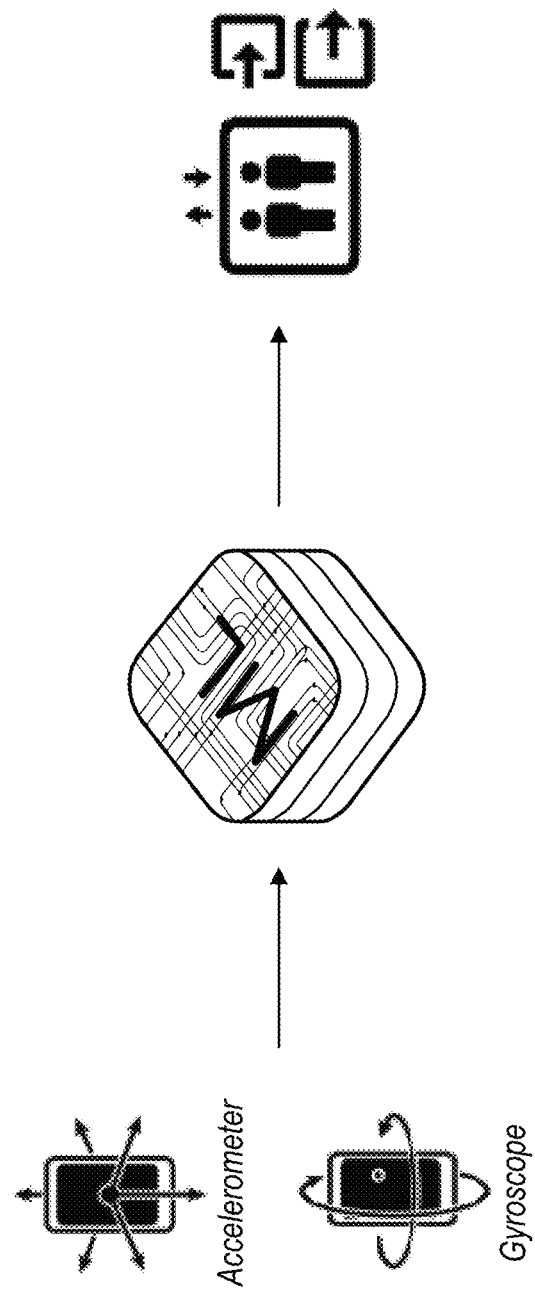
FIGS. 14-16 illustrate aspects of various possible approaches that could be used to determine when a wireless device is entering and exiting an elevator using motion sensing information, according to some embodiments.

As another possible approach to determining when to operate in elevator mode, a motion detection based approach may be used. FIG. 14 illustrates aspects of one possible such approach, according to some embodiments. As shown, it may be possible to utilize accelerator and gyroscope sensor data, with one or more machine learning (ML) techniques, to detect whether a wireless device enters or exits an elevator. The detection could include multiple aspects, such as elevator start and stop detection, and walking mode detection, among various possibilities.

Figure 15:
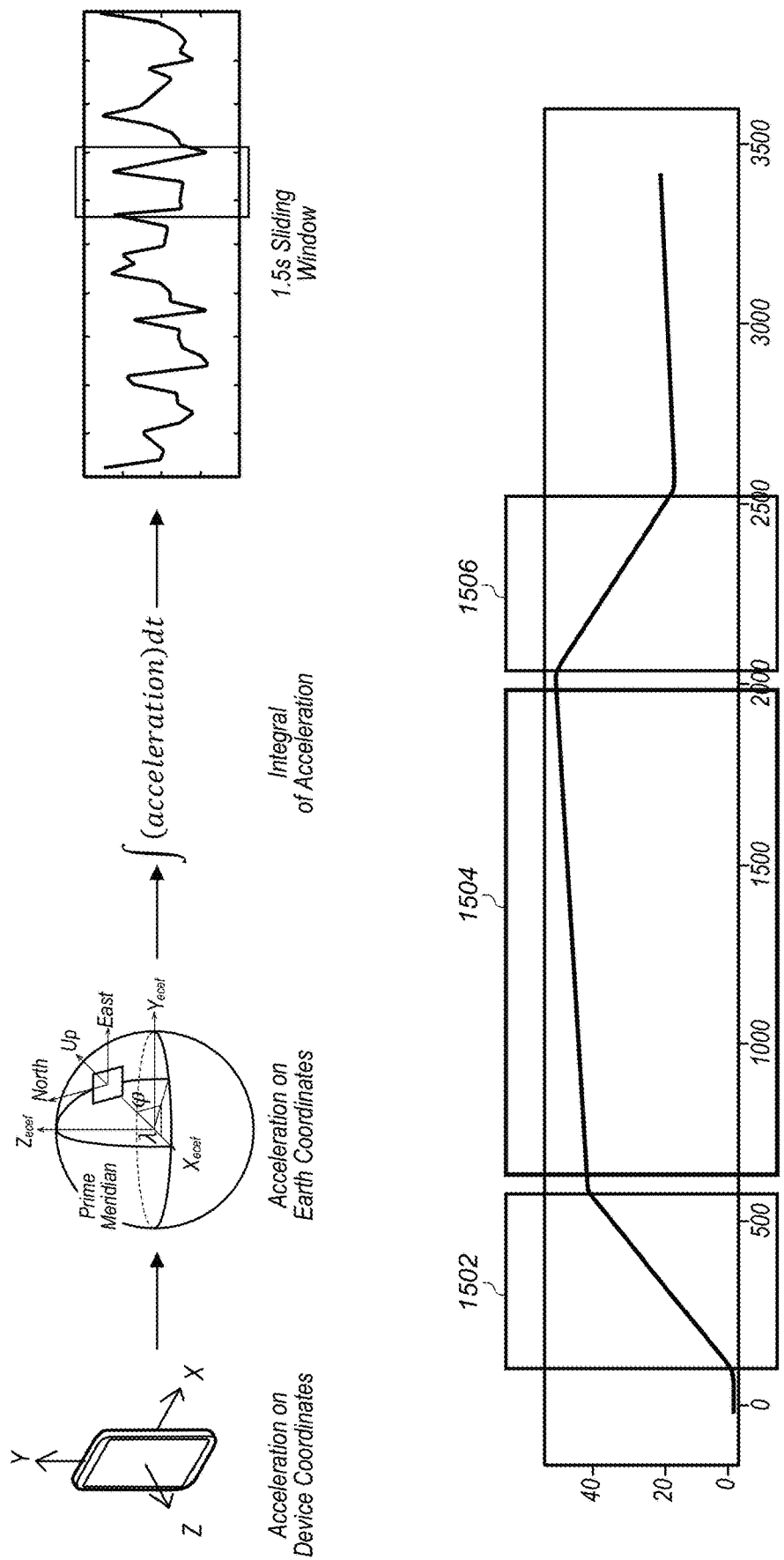

FIG. 15 illustrates further details of how elevator start and stop detection could be performed, according to some embodiments. As shown, initially raw acceleration data may be obtained from an accelerometer component of the wireless device. The data may be converted from wireless device coordinates to Earth coordinates. An integral of the acceleration (in Earth coordinates) may be taken, and monitored using a sliding time window (e.g., a 1.5 s window, as shown, or any other desired window length). If the acceleration pattern matches a defined elevator start pattern or a defined elevator stop pattern, this may be detected by the wireless device. For example, the illustrated portion 1502 may represent an elevator start pattern, the illustrated portion 1504 may represent an elevator run pattern, and the illustrated portion 1506 may represent an elevator stop pattern, some or all of which may be detectable using such an approach.

Figure 16:
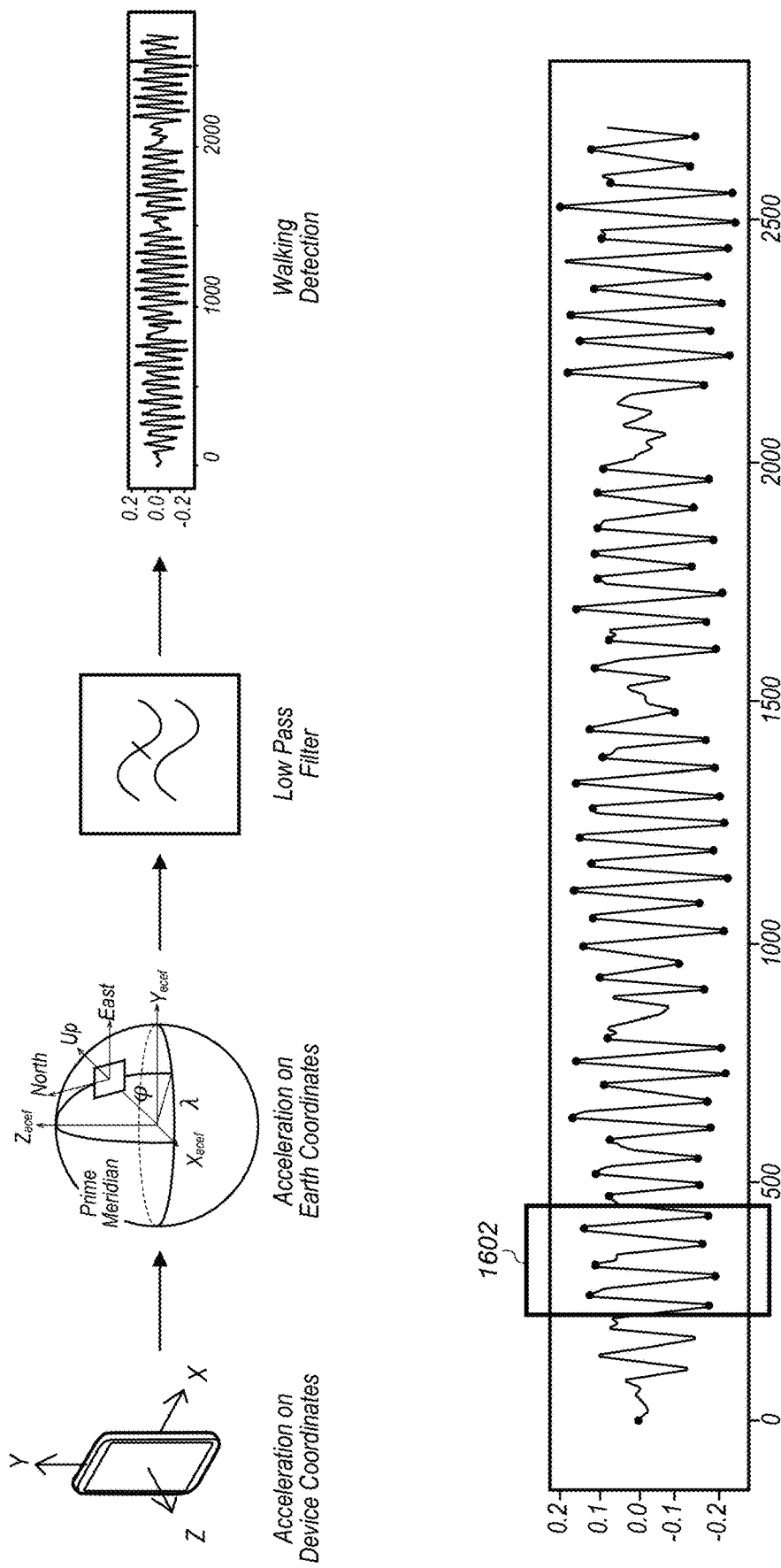

FIG. 16 illustrates further details of how walking mode detection could be performed, according to some embodiments. As shown, initially raw acceleration data may be obtained from an accelerometer component of the wireless device. The data may be converted from wireless device coordinates to Earth coordinates. The data may be low pass filtered, e.g., to smooth the curve. If the resulting pattern matches a defined walking pattern, this may be detected by the wireless device. Such detection may be possible within 5 steps or 3 s, as one possibility. Other numbers of steps and/or amounts of time to perform walking detection may also be possible. For example, the illustrated portion 1602 may represent a walking pattern, which may be detectable using such an approach.

As one possibility for using such a motion detection events to trigger operating in elevator mode, it may be the case that elevator start detection is configured as an entering elevator event, which may in turn trigger operation in elevator mode. As one possibility for using such a motion detection events to trigger operating in normal mode, it may be the case that detection of walking mode after elevator stop detection is configured as an exiting elevator event, which may in turn trigger operation in normal mode.

While operating in elevator mode, it may be beneficial to make certain operational modifications relative to the normal mode to facilitate more quickly regaining LTE (or another preferred RAT) signal, possibly with a preference to avoid regression in a false alarm case.

Figures 17, 18:
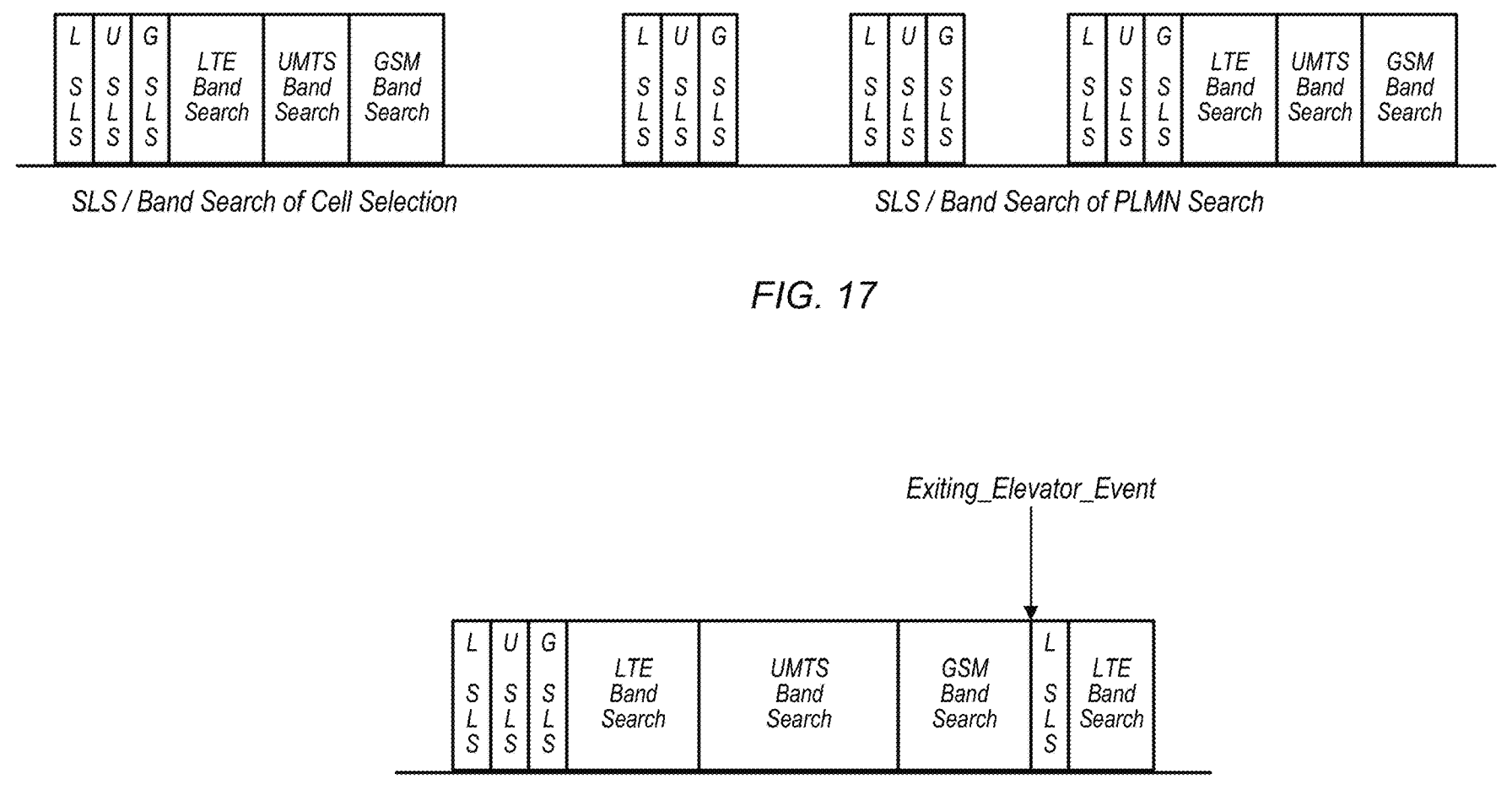

As one such possible modification, if the wireless device is out of service (OOS), one or more band searches for certain RATs may be disabled or skipped one or more times, e.g., when performing a PLMN search. The specific RATs disabled or skipped may depend on knowledge of carrier signal coverage, in some instances. Note that if desired, a (e.g., initial) cell selection band search may still be performed, such that it may still be possible for the wireless device to camp on a RAT for which PLMN band search is disabled in a timely manner if available. FIG. 17 illustrates such an OOS search timeline that could be used by a wireless device operating in elevator mode. Since one or more non-preferred RAT band searches may be skipped in such an approach, the interval between searches for a preferred RAT may be shorter and such searches may correspondingly occur more frequently, at least according to some embodiments.

As another such possible modification, if the wireless device has a GSM serving cell, the wireless device may utilize a stored (e.g., recently used and/or recent neighbor) LTE frequency list to determine candidate neighbor LTE cells on which to perform IRAT measurements and to which to potentially reselect before receiving all instances of the SI2quater system information that provides LTE neighbor cell information. This may allow the wireless device to more quickly perform such IRAT measurements and potential reselections than by waiting to receive all SI2quater instances. Note that the wireless device may still utilize the SI2quater system information to perform such measurements/reselections once the all of the SI2quater instances have been received.

As a still further possible modification, in a 1×/hybrid case, the wireless device may utilize a more aggressive BSR/dormancy timer while in elevator mode than while in normal mode. For example, instead of a BSR timer pattern of 30 s-60 s-120 s-180 s while in 1× idle mode, a consistent 10 s BSR timer may be used. Similarly, instead of a dormancy timer pattern of 30 s-60 s-120 s-240 s while in 1×/hybrid traffic mode, a consistent 10 s dormancy timer may be used. Note that other modified BSR/dormancy timer values may also or alternatively be used, as desired. Such use of a more aggressive BSR/dormancy timer may result in the wireless device more quickly reselecting to LTE (or another preferred RAT) than might otherwise occur.

As yet another possible modification, if the wireless device is OOS when an exiting elevator event is received, it may be beneficial to schedule one LTE (or other preferred RAT) search (e.g., a search based on a stored carrier frequency list and a LTE band search) when the exiting elevator event is received. Such a search may interrupt any ongoing modem activity, at least in some instances, e.g., to prioritize the LTE search. For example, FIG. 18 illustrates an example timeline in which an exiting elevator event is detected during an ongoing GSM band search, such that the GSM band search is interrupted by the LTE search triggered by the exiting elevator event. As it may be the case that exiting an elevator is correlated with an increased likelihood of availability of LTE service, such an approach may result in the wireless device more quickly regaining LTE service than if the wireless device were to continue with its ongoing search pattern, at least in some instances.

In the following further exemplary embodiments are provided.

One set of embodiments may include an apparatus, comprising: a processing element configured to cause a wireless device to: establish a cellular link with a cellular base station; detect one or more conditions associated with being in an elevator; determine to operate in an elevator mode based at least in part on detecting the one or more conditions associated with being in an elevator; operate in the elevator mode; detect one or more conditions associated with exiting an elevator; determine to operate in a normal mode based at least in part on detecting the one or more conditions associated with exiting an elevator; and operate in the normal mode, wherein the wireless device is configured to search for cellular service in the elevator mode in a different manner than when in the normal mode.

According to some embodiments, the one or more conditions associated with being in an elevator include a decrease in serving cell signal strength of at least a signal strength threshold over a specified time window.

According to some embodiments, the serving cell operates according to LTE, wherein one or more conditions associated with being in an elevator further include losing LTE service within a specified duration of the decrease in serving cell signal strength of at least the signal strength threshold over the specified time window.

According to some embodiments, the processing element is further configured to cause the wireless device to: initiate a timer associated with the elevator mode when determining to operate in the elevator mode, wherein the one or more conditions associated with exiting an elevator include expiration of the timer associated with the elevator mode.

According to some embodiments, to detect the one or more conditions associated with being in an elevator, the processing element is further configured to cause the wireless device to: monitor motion sensing information for the wireless device; and determine that the motion sensing information matches a motion pattern associated with elevator movement.

According to some embodiments, to detect the one or more conditions associated with exiting an elevator, the processing element is further configured to cause the wireless device to: monitor motion sensing information for the wireless device; and determine that the motion sensing information matches a motion pattern associated with stopping of elevator movement and that the motion sensing information matches a motion pattern associated with walking.

According to some embodiments, when operating in the elevator mode when out-of-service, the wireless device is further configured to: perform a scan for service using a different scanning pattern than when operating in the normal mode.

According to some embodiments, when operating in the elevator mode when a serving cell of the wireless device operates according to at least one non-LTE RAT, the wireless device is configured to: perform LTE neighboring cell measurement and reselection based on LTE neighboring cells previously stored by the wireless device, wherein when operating in the normal mode when a serving cell of the wireless device operates according to the at least one non-LTE RAT, the wireless device is configured to: perform LTE neighboring cell measurement and reselection based on system information provided by the serving cell.

According to some embodiments, when operating in the elevator mode when a serving cell of the wireless device operates according to at least one non-LTE RAT: search for LTE cells more frequently than when operating in the normal mode.

Another set of embodiments may include a wireless device, comprising: an antenna; a radio operably coupled to the antenna; and a processing element operably coupled to the radio; wherein the wireless device is configured to: detect one or more conditions associated with being in an elevator; operate in an elevator mode with respect to cellular communication based at least in part on detecting the one or more conditions associated with being in an elevator; detect one or more conditions associated with exiting an elevator; and operate in a normal mode with respect to cellular communication based at least in part on detecting the one or more conditions associated with exiting an elevator, wherein when operating in the elevator mode, the wireless device is configured to search for service in a different manner than when operating in the normal mode.

According to some embodiments, the one or more conditions associated with being in an elevator include a loss of service according to a first radio access technology (RAT) occurring within a specified duration after a serving cell signal strength decrease event.

According to some embodiments, the serving cell signal strength decrease event includes a decrease in filtered serving cell signal strength of at least a signal strength threshold over a specified time window, wherein the signal strength threshold is selected based at least in part on an average serving cell signal strength during the specified time window.

According to some embodiments, the wireless device is further configured to: initiate a timer associated with the elevator mode, wherein the timer associated with the elevator mode has a length of a specified duration minus a difference in time between the loss of service according to the first RAT and the serving cell signal strength decrease event, wherein the one or more conditions associated with exiting an elevator include expiration of the timer associated with the elevator mode.

According to some embodiments, one or more conditions associated with being in an elevator or associated with exiting an elevator are detected using motion sensing information collected by the wireless device.

According to some embodiments, wherein when operating in the elevator mode, the wireless device is configured to search for cellular service according to a preferred radio access technology one or more of: more frequently than when operating in the normal mode; or more quickly than when operating in the normal mode.

Yet another set of embodiments may include a method, comprising: by a wireless device: detecting one or more conditions configured to trigger operation in an elevator mode; operating in the elevator mode based at least in part on the one or more conditions configured to trigger operation in the elevator mode, wherein when operating in the elevator mode, the wireless device is configured to modify a manner in which searching for cellular service is performed; detecting one or more conditions configured to trigger ceasing operation in the elevator mode; and ceasing operation in the elevator mode based at least in part on the one or more conditions configured to trigger ceasing operation in the elevator mode.

According to some embodiments, detecting one or more conditions configured to trigger operation in an elevator mode further comprises: monitoring a filtered signal strength metric for a serving cell of the wireless device over a sliding time window; and determining that a change in filtered signal strength of the serving cell over a time window matches at least one configured signal strength decrease event profile, wherein the match with the at least one configured signal strength decrease event profile is further based at least in part on an average filtered signal strength of the serving cell over the time window.

According to some embodiments, the one or more conditions configured to trigger operation in an elevator mode comprise use of motion sensing information to detect a motion pattern associated with elevator movement; wherein the one or more conditions configured to trigger ceasing operation in the elevator mode comprise use of motion sensing information to detect a motion pattern associated with stopping of elevator movement and a motion pattern associated with walking.

According to some embodiments, operating in the elevator mode further comprises: searching for cellular service according to a preferred radio access technology more frequently than when not operating in the elevator mode.

According to some embodiments, operating in the elevator mode further comprises: searching for cellular service according to a preferred radio access technology more quickly than when not operating in the elevator mode.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
at least one processor configured to cause a wireless device to:
establish a cellular link with a cellular base station corresponding to a serving cell of the wireless device operating according to at least one radio access technology (RAT);
detect one or more conditions associated with being in an elevator;
determine to operate in an elevator mode based at least in part on detecting the one or more conditions associated with being in an elevator;
operate in the elevator mode;
perform neighboring cell measurement and reselection based on neighboring cells previously stored by the wireless device;
detect one or more conditions associated with exiting an elevator;
determine to operate in a normal mode based at least in part on detecting the one or more conditions associated with exiting an elevator;
operate in the normal mode; and
perform neighboring cell measurement and reselection based on system information provided by the serving cell,
wherein the wireless device is configured to search for cellular service in the elevator mode in a different manner than when in the normal mode.

2. The apparatus of claim 1,
wherein the one or more conditions associated with being in an elevator include a decrease in serving cell signal strength of at least a signal strength threshold over a specified time window.

3. The apparatus of claim 2,
wherein the serving cell operates according to LTE, wherein one or more conditions associated with being in an elevator further include losing LTE service within a specified duration of the decrease in serving cell signal strength of at least the signal strength threshold over the specified time window.

4. The apparatus of claim 3, wherein the at least one processor is further configured to cause the wireless device to:
initiate a timer associated with the elevator mode when determining to operate in the elevator mode,
wherein the one or more conditions associated with exiting an elevator include expiration of the timer associated with the elevator mode.

5. The apparatus of claim 1, wherein to detect the one or more conditions associated with being in an elevator, the at least one processor is further configured to cause the wireless device to:
monitor motion sensing information for the wireless device; and
determine that the motion sensing information matches a motion pattern associated with elevator movement.

6. The apparatus of claim 1, wherein to detect the one or more conditions associated with exiting an elevator, the at least one processor is further configured to cause the wireless device to:
monitor motion sensing information for the wireless device; and
determine that the motion sensing information matches a motion pattern associated with stopping of elevator movement and that the motion sensing information matches a motion pattern associated with walking.

7. The apparatus of claim 1,
wherein when operating in the elevator mode when out-of-service, the wireless device is further configured to:
perform a scan for service using a different scanning pattern than when operating in the normal mode.

8. The apparatus of claim 1,
wherein when operating in the elevator mode when a serving cell of the wireless device operates according to at least one non-LTE RAT, the wireless device is configured to:
perform LTE neighboring cell measurement and reselection based on LTE neighboring cells previously stored by the wireless device,
wherein when operating in the normal mode when a serving cell of the wireless device operates according to the at least one non-LTE RAT, the wireless device is configured to:
perform LTE neighboring cell measurement and reselection based on system information provided by the serving cell.

9. The apparatus of claim 1,
wherein when operating in the elevator mode when a serving cell of the wireless device operates according to at least one non-LTE RAT:
search for LTE cells more frequently than when operating in the normal mode.

10. A wireless device, comprising:
an antenna;
a radio operably coupled to the antenna; and
at least one processor operably coupled to the radio;
wherein the wireless device is configured to:
detect one or more conditions associated with being in an elevator;
operate in an elevator mode with respect to cellular communication based at least in part on detecting the one or more conditions associated with being in an elevator;
initiate a timer associated with the elevator mode when operating in the elevator mode:
detect one or more conditions associated with exiting an elevator,
wherein the one or more conditions associated with exiting an elevator include expiration of the timer associated with the elevator mode; and
operate in a normal mode with respect to cellular communication based at least in part on detecting the one or more conditions associated with exiting an elevator,
wherein when operating in the elevator mode, the wireless device is configured to search for service in a different manner than when operating in the normal mode.

11. The wireless device of claim 10,
wherein the one or more conditions associated with being in an elevator include a loss of service according to a first radio access technology (RAT) occurring within a specified duration after a serving cell signal strength decrease event.

12. The wireless device of claim 11,
wherein the serving cell signal strength decrease event includes a decrease in filtered serving cell signal strength of at least a signal strength threshold over a specified time window, wherein the signal strength threshold is selected based at least in part on an average serving cell signal strength during the specified time window.

13. The wireless device of claim 11,
wherein the timer associated with the elevator mode has a length of a specified duration minus a difference in time between the loss of service according to the first RAT and the serving cell signal strength decrease event.

14. The wireless device of claim 10,
wherein one or more conditions associated with being in an elevator or associated with exiting an elevator are detected using motion sensing information collected by the wireless device.

15. The wireless device of claim 10, wherein when operating in the elevator mode, the wireless device is configured to search for cellular service according to a preferred radio access technology one or more of:
more frequently than when operating in the normal mode; or
more quickly than when operating in the normal mode.

16. A method, comprising:
by a wireless device:
establishing a cellular link with a cellular base station corresponding to a serving cell of the wireless device operating according to at least one radio access technology (RAT);
detecting one or more conditions configured to trigger operation in an elevator mode;
operating in the elevator mode based at least in part on the one or more conditions configured to trigger operation in the elevator mode, wherein when operating in the elevator mode, the wireless device is configured to modify a manner in which searching for cellular service is performed, wherein the wireless device is configured to search for cellular service, corresponding to a RAT other than the at least one RAT, more frequently in the elevator mode than when in the normal mode;

detecting one or more conditions configured to trigger ceasing operation in the elevator mode; and ceasing operation in the elevator mode based at least in part on the one or more conditions configured to trigger ceasing operation in the elevator mode.

17. The method of claim 16, wherein detecting one or more conditions configured to trigger operation in an elevator mode further comprises:

monitoring a filtered signal strength metric for a serving cell of the wireless device over a sliding time window; and determining that a change in filtered signal strength of the serving cell over a time window matches at least one configured signal strength decrease event profile, wherein the match with the at least one configured signal strength decrease event profile is further based at least in part on an average filtered signal strength of the serving cell over the time window.

18. The method of claim 16, wherein the one or more conditions configured to trigger operation in an elevator mode comprise use of motion sensing information to detect a motion pattern associated with elevator movement;

wherein the one or more conditions configured to trigger ceasing operation in the elevator mode comprise use of motion sensing information to detect a motion pattern associated with stopping of elevator movement and a motion pattern associated with walking.

19. The method of claim 16, wherein operating in the elevator mode further comprises:

initiating a timer associated with the elevator mode, wherein the one or more conditions associated with exiting an elevator include expiration of the timer associated with the elevator mode.

20. The method of claim 16, wherein operating in the elevator mode further comprises:

searching for cellular service according to a preferred radio access technology more quickly than when not operating in the elevator mode.

\* \* \* \* \*